(12) United States Patent
Furukawa

(10) Patent No.: US 10,914,351 B2
(45) Date of Patent: Feb. 9, 2021

(54) OPPOSED PISTON TYPE DISC BRAKE

(71) Applicant: ADVICS CO., LTD., Kariya (JP)

(72) Inventor: Kazuma Furukawa, Nagoya (JP)

(73) Assignee: ADVICS CO., LTD., Kariya (JP)

(*) Notice: Subject to any disclaimer, the term of this patent is extended or adjusted under 35 U.S.C. 154(b) by 0 days.

(21) Appl. No.: 16/346,554

(22) PCT Filed: Nov. 16, 2017

(86) PCT No.: PCT/JP2017/041177
§ 371 (c)(1),
(2) Date: May 1, 2019

(87) PCT Pub. No.: WO2018/092820
PCT Pub. Date: May 24, 2018

(65) Prior Publication Data
US 2019/0257377 A1 Aug. 22, 2019

(30) Foreign Application Priority Data
Nov. 18, 2016 (JP) .................................. 2016-224706

(51) Int. Cl.
*F16D 65/097* (2006.01)
*F16D 63/00* (2006.01)
(Continued)

(52) U.S. Cl.
CPC ......... *F16D 63/004* (2013.01); *F16D 55/227* (2013.01); *F16D 55/228* (2013.01);
(Continued)

(58) Field of Classification Search
CPC ............. F16D 65/0979; F16D 65/0973; F16D 65/0974; F16D 65/0975; F16D 65/0977;
(Continued)

(56) References Cited

U.S. PATENT DOCUMENTS

2008/0060888 A1* 3/2008 Arakawa ............. F16D 65/0977
188/73.45
2014/0251736 A1* 9/2014 Nanri .................. F16D 65/0068
188/72.2

FOREIGN PATENT DOCUMENTS

JP 2002276703 A 9/2002
JP 2008064232 A 3/2008
(Continued)

OTHER PUBLICATIONS

International Search Report (PCT/ISA/210) dated Feb. 20, 2018, by the Japanese Patent Office as the International Searching Authority for International Application No. PCT/JP2017/041177.
(Continued)

*Primary Examiner* — Nicholas J Lane
(74) *Attorney, Agent, or Firm* — Buchanan Ingersoll & Rooney PC

(57) ABSTRACT

In this disc brake, a pair of brake pads has recesses in the outer peripheral surfaces thereof. A pad spring has a first pressing section extending axially and provided to a base, the first pressing section pressing, toward the trailing side, a first section to be pressed which is provided on the trailing-side side surface of side surfaces which form the recess of a brake pad—and which are raised outward in the radial direction of a rotor. Also, the pad spring has a second pressing section extending axially and provided to the base, the second pressing section—pressing radially inward on the bottom surface of the recess of each of the pair of brake pads, the bottom surface being a second section to be pressed which is provided on an outer peripheral section.

5 Claims, 5 Drawing Sheets

(51) Int. Cl.
- *F16D 55/228* (2006.01)
- *F16D 65/095* (2006.01)
- *F16D 65/092* (2006.01)
- *F16D 55/227* (2006.01)
- *F16D 55/00* (2006.01)

(52) U.S. Cl.
CPC ......... *F16D 65/092* (2013.01); *F16D 65/095* (2013.01); *F16D 65/097* (2013.01); *F16D 65/0973* (2013.01); *F16D 65/0974* (2013.01); *F16D 2055/0075* (2013.01)

(58) Field of Classification Search
CPC ... F16D 65/0978; F16D 55/227; F16D 55/228
USPC ...................................................... 188/73.46
See application file for complete search history.

(56) References Cited

FOREIGN PATENT DOCUMENTS

| | | |
|---|---|---|
| JP | 2010270894 A | 12/2010 |
| JP | 2014224581 A | 12/2014 |

OTHER PUBLICATIONS

Written Opinion (PCT/ISA/237) dated Feb. 20, 2018, by the Japanese Patent Office as the International Searching Authority for International Application No. PCT/JP2017/041177.

\* cited by examiner

OPPOSED PISTON TYPE DISC BRAKE

TECHNICAL FIELD

The present invention relates to an opposed piston type disc brake for braking a vehicle.

BACKGROUND ART

Conventionally, for example, a disc brake disclosed in the following patent literature 1 is known. In the conventional disc brake (hereinafter referred to as "first conventional disc brake"), a pad clip that presses a protrusion provided on a brake pad in a rotating direction (trailing side) of a disc rotor is provided. The pad clip includes a fulcrum portion extending from a main frame and engaging with a retaining pin, an acting point portion obtained by performing a bending process on the fulcrum portion to press the protrusion of the brake pad toward the rotating direction (trailing side), and a power point portion that acts a force to the acting point portion by utilizing principle of leverage and the elastic force of the material. Then, the force point portion is adapted to be engaged with the retaining pin in a state in which the acting point portion is elastically deformed to apply pressing force to the brake pad. Thus, the pressing force is applied to the brake pad in a state in which the main frame of the pad clip is in a fixed state. Therefore, in the first conventional disc brake, rattling of the brake pad is prevented and rattling sound and clunking sound caused by the rattling are suppressed.

However, in the first conventional disc brake, in the case where the acting point portion of the pad clip is provided, the number of places to perform the bending process on the fulcrum portion is increased, and it becomes difficult to uniformly maintain both the performance of supporting the brake pad and the performance of pressing the brake pad in manufacturing the pad clip in large amounts. Furthermore, since the acting point portion is extended from the main frame, for example, distortion easily occurs in the pad clip at the time of bending process, and the yield may be degraded.

On the other hand, for example, an opposed piston type disc brake disclosed in the following patent literature 2 is known. This conventional opposed piston type disc brake (hereinafter referred to as "second conventional disc brake") does not have a complicated bent shape as compared with the above-mentioned first conventional disc brake, and is easily manufactured.

CITATIONS LIST

Patent Literature

Patent Literature 1: Japanese Laid-Open Patent Publication No. 2010-270894
Patent Literature 2: Japanese Unexamined Patent Application Publication No. 2014-224581

SUMMARY OF INVENTION

Technical Problems

In the conventional disc brake, compared to the first conventional disc brake, there are fewer places to be performed with the bending process, and both the performance of supporting the brake pad and the performance of pressing the brake pad can be uniformly maintained even in manufacturing the pad clip in large amounts. In addition, since there are fewer places to be performed with the bending process, distortion hardly occurs in the pad clip at the time of the bending process, and the yield can be increased. In the disc brake, further reduction of the abnormal sound (e.g., brake noise) and abutment sound (clunking sound) generated during braking, and the abnormal sound (rattling sound) generated by vibration of the brake pad during non-braking is desired.

In view of solving the problems described above, the present invention provides a disc brake that stabilizes an orientation of a brake pad at the time of braking and suppresses the generation of abnormal sound by a simple structure.

Solutions to Problems

In order to solve the above problem, the invention of an opposed piston type disc brake according to claim includes a disk-shaped disc rotor; a caliper that is provided so as to cross one portion of an outer peripheral section of the disc rotor and that accommodates pistons arranged on both sides in an axial direction of the disc rotor; a pair of brake pads pressed by the piston in an interior of the caliper to press the disc rotor from both sides in the axial direction; a pair of pad pins provided on a leading side and a trailing side in a circumferential direction of the disc rotor to support the pair of brake pads to be movable in the axial direction with respect to the caliper; and a pad spring including a base extending in the axial direction and a locking portion extending from the base toward the leading side and the trailing side in the circumferential direction and locked with the pair of pad pins, the pad spring pressing the pair of brake pads; where the pair of brake pads includes a first section to be pressed provided on the trailing side of the outer peripheral section and raised outward in a radial direction of the disc rotor, and a second section to be pressed provided on the outer peripheral section; and the pad spring includes a first pressing section that extends in the axial direction and is provided on the base and that presses the first section to be pressed of the pair of brake pads toward the trailing side, and a second pressing section that extends in the axial direction and is provided on the base and that presses the second section to be pressed of the pair of brake pads inward in the radial direction.

Advantageous Effects of Invention

Therefore, in the pad spring, the first pressing section can press the pair of brake pads toward the trailing side through the first section to be pressed. Furthermore, in the pad spring, the second pressing section can press the brake pads inward in the radial direction of the rotor through the second section to be pressed. This can stabilize the orientation of the pair of brake pads, and prevent generation of abnormal sound (brake noise) and abutment sound (clunking sound) generated at the time of braking, abnormal sound (rattling sound) generated at the time of non-braking, and the like.

In addition, the number of bending processes in manufacturing the pad spring can be greatly reduced, and the pad spring can be manufactured extremely easily. This makes it possible to easily ensure uniform performance even in mass production. Furthermore, since the first pressing section and the second pressing section can be provided on the base, distortion caused by the bending process can be reduced, and as a result, the pad spring having uniform performance can be manufactured. Therefore, in the manufacture of the pad spring, the yield can be increased and the manufacturing cost can be reduced.

DESCRIPTION OF EMBODIMENTS

Figure 1:
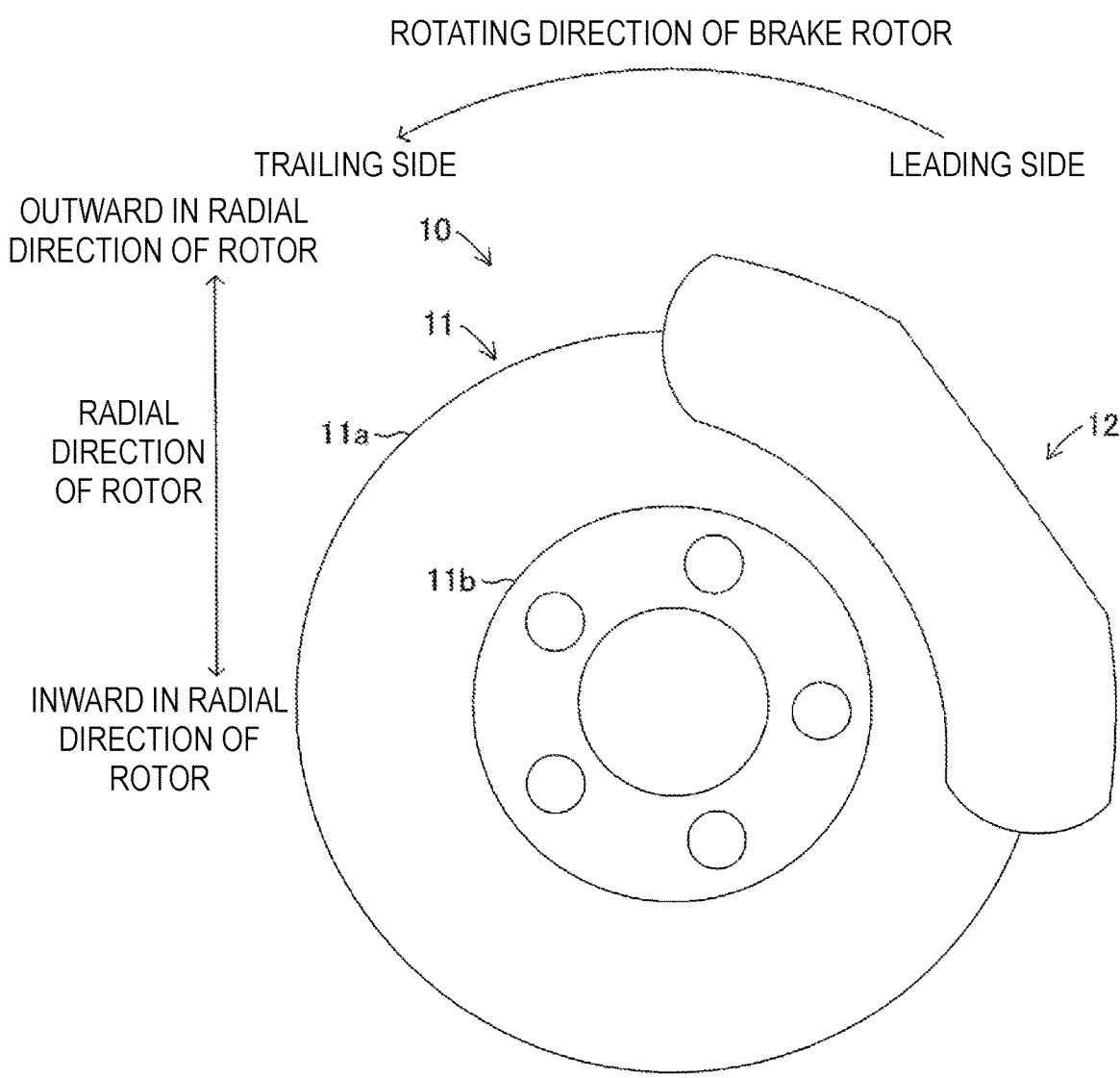
FIG. 1 is an overall view of an opposed piston type disc brake in accordance with an embodiment of the present invention.

Hereinafter, an embodiment of the present invention will be described with reference to the drawings. In the following embodiments and modified examples, the same or equivalent parts are denoted by the same reference numerals in the drawings. Each figure used for explanation is a conceptual diagram, and the shape of each part is not necessarily exact in some cases.

As shown in FIG. 1, an opposed piston type disc brake 10 (hereinafter also simply referred to as "disc brake 10") includes a disk-shaped disc rotor 11 and a caliper 12 that crosses one portion of the disc rotor 11. The disc rotor 11 is formed by a disk-shaped rotor main body 11a and a cylindrical hat section 11b fastened to an axle (not shown) of a vehicle (not shown) by bolts and nuts or the like. In the following description, the axial direction of the disk-shaped disc rotor 11 is referred to as "axial direction of rotor", the circumferential direction of the disc rotor 11 is referred to as "circumferential direction of rotor", an outer side in a radial direction of the disc rotor 11 is referred to as "outward in radial direction of rotor", and an inner side in the radial direction of the disc rotor 11 is referred to as "inward in radial direction of rotor". Further, in a rotating direction of the disc rotor 11 when the vehicle is moving forward, a side on which the rotor main body 11a of the disc rotor 11 enters the caliper 12 is referred to as "leading side" and a side on which the rotor main body 11a of the disc rotor 11 exits from the caliper 12 is referred to as "trailing side".

Figure 2:
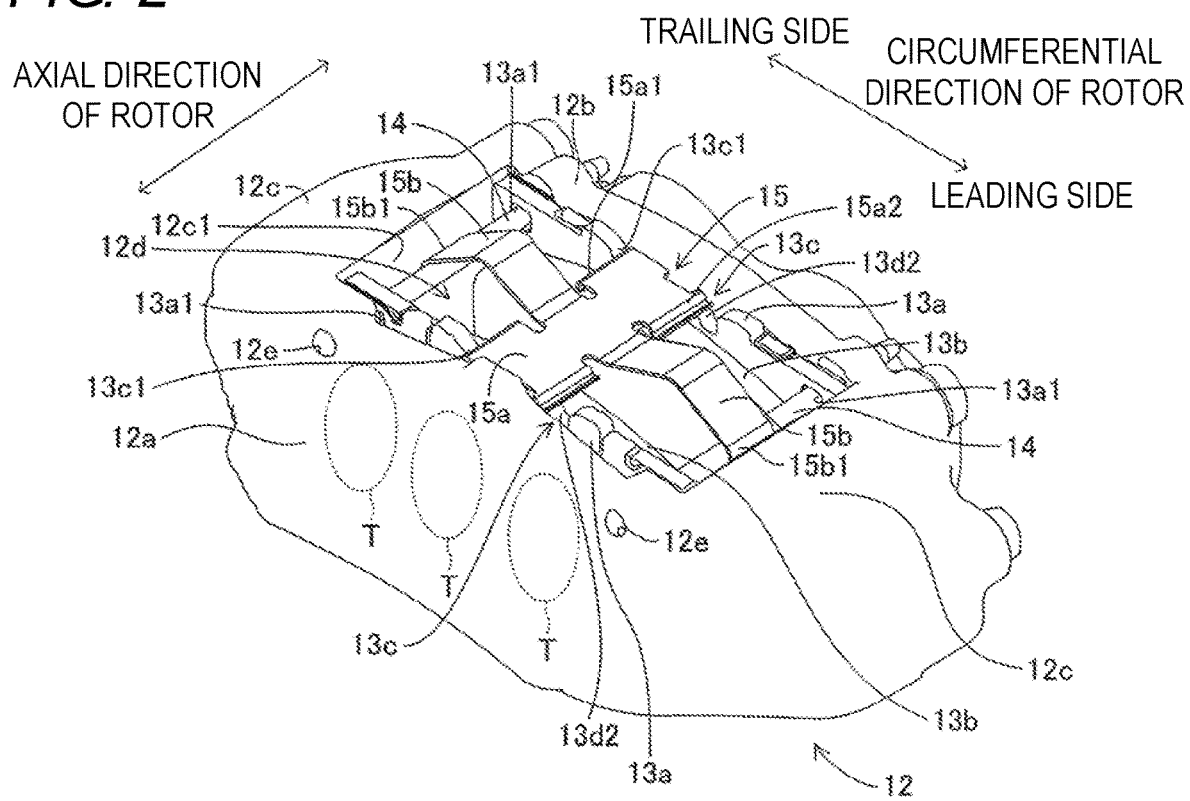
FIG. 2 is a perspective view showing a configuration of a caliper of FIG. 1.

The caliper 12 is fixed to a non-rotating section of the vehicle (e.g., on the side of a vehicle body not shown) and is provided so as to cross a part of the outer peripheral section of the disc rotor 11. The caliper 12 accommodates pistons T (indicated by broken lines in FIG. 2) disposed on both sides in the axial direction of the rotor of the disc rotor 11. As shown in FIG. 2, the caliper 12 has an inner section 12a and an outer section 12b that respectively accommodate the piston T. Furthermore, the caliper 12 has a bridge section 12c that connects the inner section 12a and the outer section 12b on the leading side and the trailing side. The bridge section 12c is provided with a torque receiving portion 12c1 which receives a braking torque transmitted from a pair of brake pads 13 to be described later at the time of braking. Furthermore, the caliper 12 includes a window section 12d formed by the inner section 12a, the outer section 12b, and the bridge section 12c. As shown in FIG. 2, a pair of brake pads 13 is accommodated and incorporated inside the window section 12d.

As shown in FIG. 2, the pair of brake pads 13 incorporated inside the caliper 12 each includes a back plate 13a and a lining 13b which is a friction material securely attached to the back plate 13a. The back plate 13a is formed to a plate shape and includes an insertion hole 13a1 through which the pad pin 14 is inserted. The back plate 13a is provided with a recess 13c, recessed inward in the radial direction of the rotor, so as to accommodate an end portion of a base 15a of the pad spring 15 to be described later.

Figure 3:
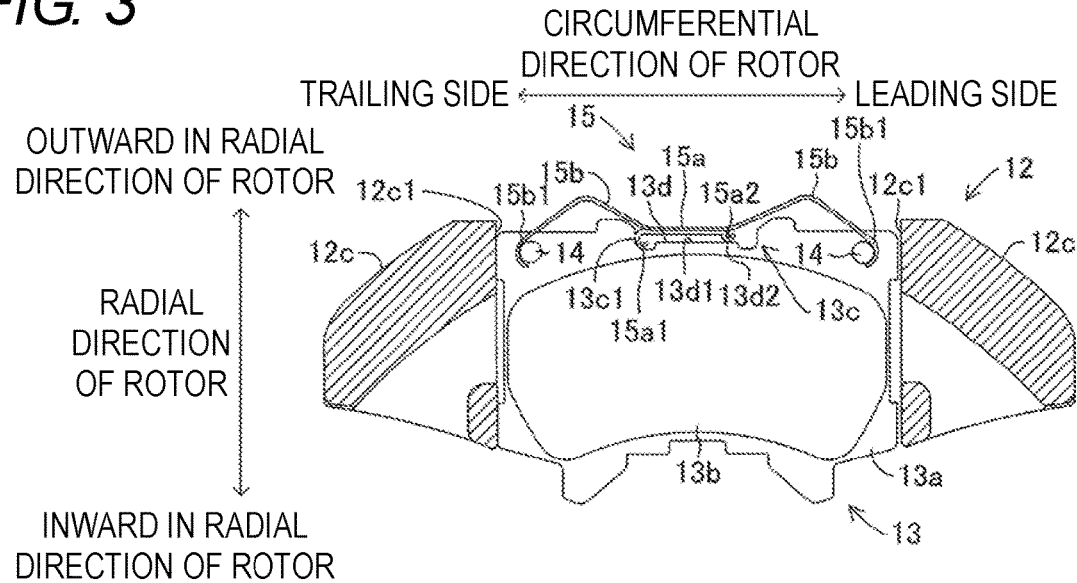
FIG. 3 is a partial cross-sectional view showing a brake pad, a pad pin and a pad spring assembled to the caliper.

As shown in FIG. 3, the recess 13c includes a first section 13c1 to be pressed by a first pressing section 15a1 of the pad spring 15, to be described later, at a side surface forming the recess 13c, that is, a side surface on the trailing side of the side surfaces raised outward in the radial direction of the rotor. The side surface on the trailing side of the recess 13c is provided so as to be substantially parallel to a pressure receiving surface of a torque receiving portion 12c1 provided on a bridge section 12c of the caliper 12 along inward in the radial direction of the rotor and outward in the radial direction of the rotor. Furthermore, as shown in FIG. 3, the recess 13c includes a projection 13d protruding outwardly in the radial direction of the rotor from a bottom surface forming the recess 13c, that is, from the outer peripheral section. A second section 13d2 to be pressed by the second pressing section 15a2 of the pad spring 15, to be described later, is provided on an end face 13d1 of the projection 13d.

As shown in FIG. 2, each of the pair of pad pins 14 is laterally bridged across the window section 12d between the inner section 12a and the outer section 12b of the caliper 12. The pad pin 14 is inserted through a pin hole 12e (outer section 12b side is not shown) provided in the inner section 12a of the caliper 12. The pad pin 14 is disposed on the leading side and the trailing side in the circumferential direction of the rotor. The pad pin 14 is inserted into the insertion hole 13a1 provided in the back plate 13a of the pair of brake pads 13 accommodated in the caliper 12. The brake pad 13 through which the pad pin 14 is inserted is supported to be movable in the axial direction of the rotor. Thus, when the pair of brake pads 13 movably supported by the pad pin 14 is pressed by the piston T, they are moved in the axial direction of the rotor and are pressed against both surfaces of the rotor main body 11a of the disc rotor 11 thus generating a braking force.

The pad spring 15 is manufactured by punching a leaf spring into a predetermined shape and performing the bending process on necessary parts of the obtained blank material. As shown in FIGS. 2 to 5, the pad spring 15 includes a base 15a and a pair of pin holding sections 15b.

Figure 4:
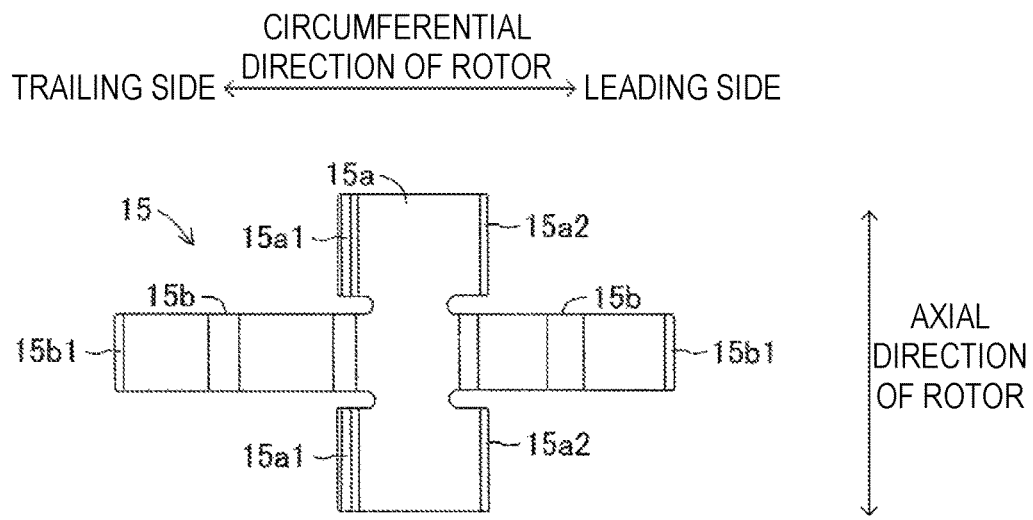
FIG. 4 is a bottom view showing a configuration of the pad spring.
Figure 5:
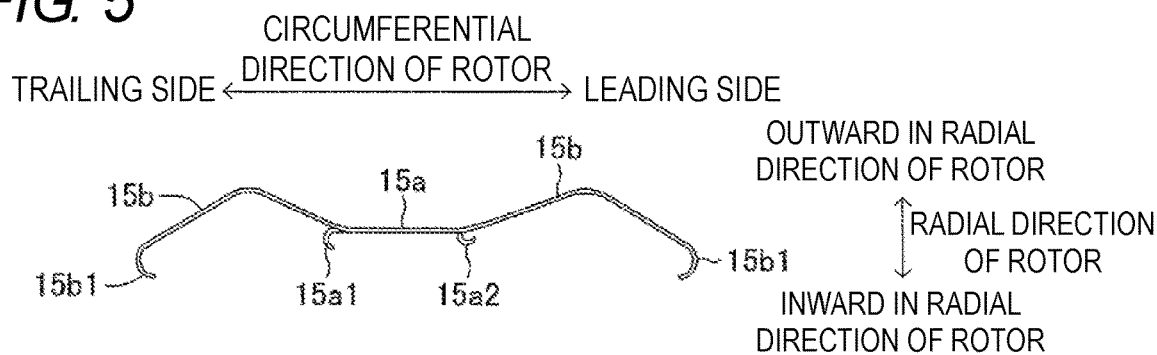
FIG. 5 is a side view showing a configuration of the pad spring.

As shown in FIG. 2, the base 15a extends in the axial direction of the rotor so as to laterally bridge across the inner section 12a and the outer section 12b of the caliper 12, and has both ends accommodated in the recess 13c of the brake pad 13. As shown in FIGS. 3 to 5, each of the pair of pin holding sections 15b extends in the circumferential direction of the rotor from substantially the central portion of the base 15a, and includes a locking portion 15b1 that engages with the pad pin 14 at a distal end.

Furthermore, the base 15a is provided with a first pressing section 15a1 on a side portion on the trailing side in a state in which the pad spring 15 is assembled to the caliper 12. The base 15a is provided with a second pressing section 15a2 on a side portion on the leading side in a state in which the pad spring 15 is assembled to the caliper 12. That is, the second pressing section 15a2 is provided on the leading side of the first pressing section 15a1 in the circumferential direction of the rotor. As shown in FIGS. 4 and 5, the first pressing section 15a1 and the second pressing section 15a2 are provided so as to project out in a direction orthogonal to the axial direction of the rotor and so as to be parallel to the axial direction of the rotor at the base 15a toward radially inward of the rotor from the base 15a (i.e., toward pair of brake pads 13).

As shown in FIG. 5, the first pressing section 15a1 is provided in a circular arc shape convex toward the trailing side in the circumferential direction of the rotor. In a state in which the pad spring 15 is assembled to the caliper 12, as shown in FIG. 3, the first pressing section 15a1 is abutted against the first section 13c1 to be pressed of the recess 13c provided in the back plate 13a of the pair of brake pads 13. Then, the first pressing section 15a1 presses the first section 13c1 to be pressed toward the trailing side so as to be perpendicular (but within allowable tolerance) to the side surface on the trailing side of the recess 13c in which the first section 13c1 to be pressed is provided. Here, the side surface on the trailing side of the recess 13c and the pressure receiving surface of the torque receiving portion 12c1 provided on the bridge section 12c are provided so as to be substantially parallel along the radial direction of the rotor. Accordingly, when the first pressing section 15a1 presses the first section 13c1 to be processed, the pair of brake pads 13 is biased and abutted against the torque receiving portion 12c1 provided in the bridge section 12c.

As shown in FIG. 5, the second pressing section 15a2 is provided in an arc shape convex inward in the radial direction of the rotor. As shown in FIG. 3, in a state in which the pad spring 15 is assembled to the caliper 12, the second pressing section 15a2 abuts against the second section 13d2 to be pressed of the recess 13c provided on the back plate 13a of the pair of brake pads 13. Then, the second pressing section 15a2 presses the second section 13d2 to be pressed inward in the radial direction of the rotors so as to be perpendicular (but within allowable tolerance) to an end face 13d1 of the projection 13d where the second pressing section 15a2 is provided. Here, the end face 13d1 of the projection 13d is provided so as to coincide with a first virtual plane H1, as described later.

As shown in FIG. 2, the pad spring 15 configured as above is assembled in a state in which a pair of brake pads 13 is accommodated in the caliper 12, and the pad pin 14 is inserted into the pin hole 12e provided in the caliper 12 and the insertion hole 13a1 provided in the back plate 13a of the pair of brake pads 13. That is, the pad spring 15 is assembled to the caliper 12 with the locking portions 15b1 of the pair of pin holding sections 15b respectively locked with the pair of pad pins 14. The pad spring 15 assembled to the caliper 12 presses each of the pair of brake pads 13 toward the trailing side in a state assembled to the caliper 12. Furthermore, the pad spring 15 assembled to the caliper 12 presses each of the pair of brake pads 13 inward in the radial direction of the rotor.

Figure 6:
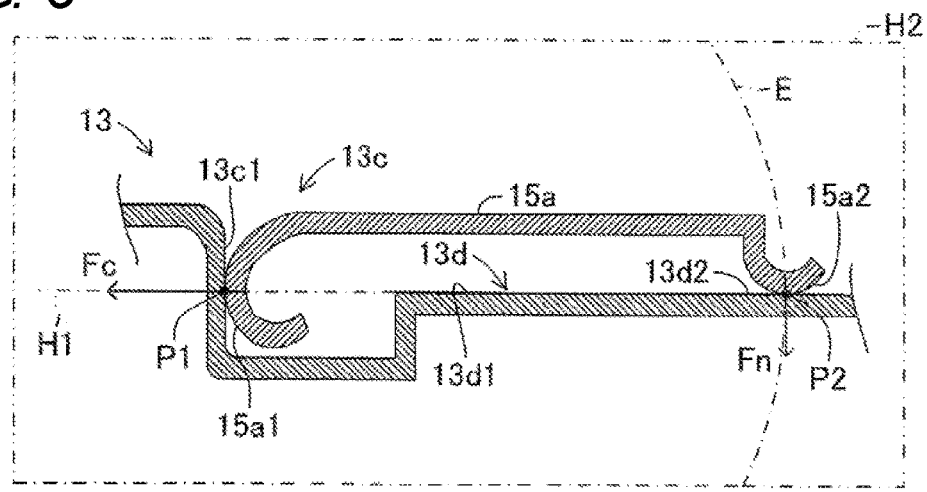
FIG. 6 is a cross-sectional view for explaining an assembling relationship between the pad spring and the brake pad.

Specifically, as shown in FIG. 6, in the pad spring 15, the first pressing section 15a1 provided on the base 15a presses the first section 13c1 to be pressed provided in the recess 13c of each of the pair of brake pads 13 perpendicularly toward the trailing side (but within allowable tolerance). Thus, the brake pad 13 is maintained in a state in which the brake pad is abutted against the torque receiving portion 12c1 on the trailing side provided in the bridge section 12c of the caliper 12 regardless of the braking state or the non-braking state where the braking force is not exerted.

Furthermore, in the pad spring 15, the second pressing section 15a2 provided on the base 15a vertically presses the second section 13d2 to be pressed provided on the projection 13d of the recess 13c of each of the pair of brake pads 13 inward in the radial direction of the rotor (but within allowable tolerance). Thus, the brake pad 13 is maintained in a state of being biased inward in the radial direction of the rotor regardless of the braking state or the non-braking state.

Here, the positional relationship between the first section 13c1 to be pressed and the second section 13d2 to be pressed in each of the pair of brake pads 13 and the first pressing section 15a1 and the second pressing section 15a2 in the pad spring 15 will be described. The relationship in the acting direction between the first pressing force Fc by the first pressing section 15a1 and the second pressing force Fn by the second pressing section 15a2 will be described. In the descriptions, as shown in FIG. 6, the point at which the first pressing section 15a1 integrally provided on the base 15a presses the first section 13c1 to be pressed of the recess 13c is set as a first pressing point P1. A point at which the second pressing section 15a2 integrally provided on the base 15a presses the second section 13d2 to be pressed of the projection 13d provided in the recess 13c is set as a second pressing point P2.

Figure 7:
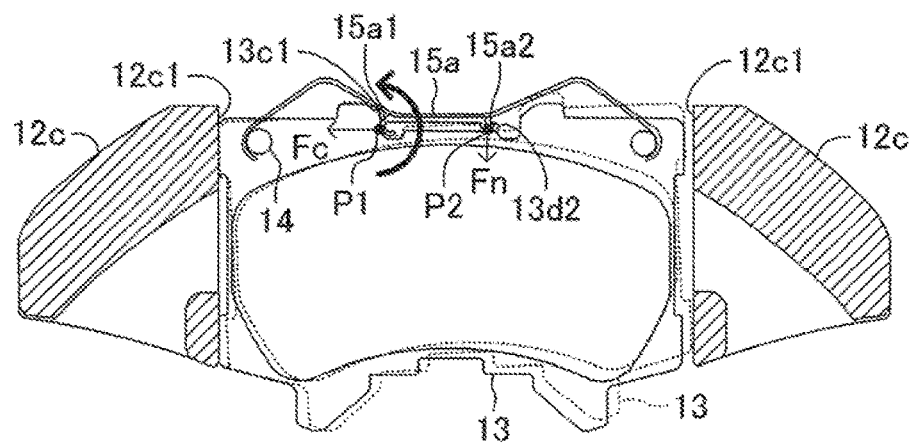
FIG. 7 is a partial cross-sectional view explaining a turning of the brake pad at the time of braking.

At the time of braking, since the first pressing section 15a1 presses the pair of brake pads 13 toward the trailing side by the first pressing force Fc, the pair of brake pads 13 is abutted against the torque receiving portion 12c1 on the trailing side. At the time of braking, as indicated by a broken line in FIG. 7, the leading side is turned outward in the radial direction of the rotor with the first pressing point P1 as the center of rotation. The turning state of the brake pad 13 indicated by the broken line in FIG. 7 shows the turning amount larger than the actual amount to facilitate the understanding.

In this case, the second pressing point P2, at which the second pressing section 15a2 presses the second section 13d2 to be pressed of the recess 13c, turns on a virtual circle E, having the first pressing point P1 as the center, integrally with the brake pad 13, as shown with a chain dashed line in FIG. 6. The virtual circle E is a circle centered on the first pressing point P1, and hence the first pressing point P1 and the second pressing point P2 exist on a first virtual plane H1 indicated by a chain double dashed line in FIG. 6. In other words, the projection 13d is provided so that the end face 13d1 where the second pressing point P2 exists coincides with the first virtual plane H1.

In addition, the first pressing section 15a1 applies the first pressing force Fc in a direction perpendicular to the side surface of the recess 13c on the trailing side (but within allowable tolerance) at the first pressing point P1. On the other hand, the second pressing section 15a2 applies the second pressing force Fn in a direction perpendicular to the end face 13d1 of the projection 13d (but within allowable tolerance) at the second pressing point P2. Therefore, the acting direction of the first pressing force Fc and the acting direction of the second pressing force Fn are orthogonal to the axial direction of the rotor, as indicated by the chain double dashed line in FIG. 6, and are orthogonal to each other on a second virtual plane H2 where the first pressing point P1 and the second pressing point P2 exist.

As shown in FIG. 6, when the first pressing point P1 and the second pressing point P2 exist on the first virtual plane H1 and the second virtual plane H2 and the acting direction of the first pressing force Fc and the acting direction of the second acting force Fn are orthogonal to each other on the second virtual plane H2, the first pressing section 15a1 can act the first pressing force Fc on the first section 13c1 to be pressed from the first pressing point P1 without generating a component force toward the trailing side. That is, the first pressing section 15a1 presses the first section 13c1 to be pressed with the first pressing force Fc at the first pressing point P1 to press the pair of brake pads 13 against the torque receiving portion 12c1. Here, the magnitude of the first pressing force Fc is set larger than the magnitude of the second pressing force Fn. Thus, the first pressing section 15a1 presses the pair of brake pads 13 to the torque receiving portion 12c1 on the trailing side of the caliper 12 through the first section 13c1 to be pressed. As a result, at the time of braking, the first pressing section 15a1 causes rotation behavior of the pair of brake pads 13 about the first pressing point P1. As for the magnitude of the first pressing force Fc, when the vehicle moves backward, that is, when the disc rotor 11 rotates in the reverse direction, the magnitude is set to an extent the pair of brake pads 13 can be prevented from moving toward the leading side (trailing side when moving backward).

Furthermore, as shown in FIG. 6, when the first pressing point P1 and the second pressing point P2 exist on the first virtual plane H1 and the second virtual plane H2 and the acting direction of the first pressing force Fc and the acting direction of the second acting force Fn are orthogonal to each other on the second virtual plane H2, the second pressing section 15a2 can act the second pressing force Fn in a direction that coincides with a tangential direction of the virtual circle E as the second pressing point P2 exists on the virtual circle E. Therefore, the second pressing section 15a2 acts the second pressing force Fn on the second section 13d2 to be pressed without generating a component force at the start of turning with respect to the second pressing point P2 turning along the virtual circle E, that is, the second section 13d2 to be pressed. Furthermore, the second pressing section 15a2 acts the component force that coincides with the tangential direction of the second pressing force Fn to the second section 13d2 to be pressed with respect to the second pressing point P2 that started turning along the virtual circle E, that is, the second section 13d2 to be pressed.

Therefore, the second pressing force Fn acting on the second pressing point P2 acts to decelerate the brake pad 13 turning about the first pressing point P1. As a result, as shown in FIG. 7, when the pair of brake pads 13 turns and abuts against the torque receiving portion 12c1 on the leading side of the caliper 12, the momentum of the turning brake pad 13 is greatly reduced.

As can be understood from the above description, according to the opposed piston type disc brake 10 of the embodiment described above, the pair of brake pads 13 includes on the outer peripheral section the recess 13c that is recessed inward in the radial direction of the disc rotor 11 and that accommodates an end portion of the base 15a of the pad spring 15; the pad spring 15 is extended in the axial direction and provided on the base 15a; and the first pressing section 15a1 which presses the first section 13c1 to be pressed provided on the trailing side of the side surface forming the recess 13c of the pair of brake pads 13 toward the trailing side, and the second pressing section 15a2 that extended in the axial direction and provided on the base 15a and that presses the second section 13d2 to be pressed provided on the bottom surface forming the recess 13c of the pair of brake pads 13 radially inward are provided.

Therefore, the number of bending processes when manufacturing the pad spring 15 can be greatly reduced, and it can be very easily manufactured. This makes it possible to easily ensure uniform performance even in mass production. In addition, since the first pressing section 15a1 and the second pressing section 15a2 can be provided on the base 15a, distortion caused by the bending process can be reduced, and as a result, the pad spring 15 having uniform performance can be manufactured. Therefore, in the manufacturing of the pad spring 15, the yield can be increased and the manufacturing cost can be reduced.

Furthermore, in the pad spring 15, the first pressing section 15a1 can press the pair of brake pads 13 toward the trailing side through the first section 13c1 to be pressed. Furthermore, the pad spring 15 can induce the rotational movement of the pair of brake pads 13 at the time of braking as the first pressing section 15a1 presses the pair of brake pads 13 toward the trailing side through the first section 13c1 to be pressed. Moreover, in the pad spring 15, the second pressing section 15a2 can press the brake pad 13 inward in the radial direction of the rotor through the second section 13d2 to be pressed. In addition, the pad spring 15 can decelerate the turning speed of the pair of brake pads 13 at the time of braking as the second pressing section 15a2 presses the brake pad 13 inward in the radial direction of the rotor through the second section 13d2 to be pressed.

Therefore, the pad spring 15 can maintain the state in which the pair of brake pads 13 is abutted against the torque receiving portion 12c1 on the trailing side of the caliper 12 at the time of braking. Thus, it is possible to effectively prevent the pair of brake pads 13 from changing their orientation relative to the caliper 12, for example, it is possible to prevent the generation of abnormal sound (specifically, brake noise) that occurs at the time of braking.

Furthermore, the pad spring 15 can reduce the impact when the pair of brake pads 13 abuts against the torque receiving portion 12c1 on the leading side of the caliper 12 at the time of braking. Therefore, the generation of an abutment sound (so-called clunking sound) between the pair of brake pads 13 and the caliper 12 generated at the time of braking can be prevented.

Furthermore, the pad spring 15 can prevent the pair of pad brakes 13 from vibrating at the time of non-braking by pressing the pair of brake pads 13 inward in the radial direction of the rotor. Therefore, the generation of abnormal sound (so-called rattling sound) caused by vibration of the pair of brake pads 13 at the time of non-braking can be prevented.

Furthermore, in this case, the second pressing section 15a2 is provided on the leading side with respect to the first pressing section 15a1 in the peripheral direction.

Thus, the second pressing section 15a2 can effectively decelerate the pair of brake pads 13 turning about the first pressing section 15a1 on the leading side. Therefore, at the time of braking, the impact of when the pair of brake pads 13 abuts against the torque receiving portion 12c1 on the leading side of the caliper 12 can be reliably reduced, and the generation of abutment sound (so-called clunking sound) between the pair of brake pads 13 and the caliper 12 can be prevented.

In addition, in these cases, the first pressing section 15a1 and the second pressing section 15a2 project out in a direction orthogonal to the axial direction from the base 15a toward the pair of brake pads 13 and are parallel to the base 15a in the axial direction.

Therefore, the first pressing section 15a1 and the second pressing section 15a2 can be provided on the base 15a by performing the bending process on both side end portions of the base 15a in one direction. Therefore, the pad spring 15 can be manufactured extremely easily, and the manufacturing cost can be greatly reduced. Furthermore, as the first pressing section 15a1 and the second pressing section 15a2 are provided in parallel with the base 15a, the pair of brake pads 13 can be uniformly pressed. Therefore, generation of abnormal sound (brake noise) and abutment sound (clunking sound) generated at the time of braking and abnormal sound (rattling sound) generated at the time of non-braking can be prevented.

In these cases, the second section 13d2 to be pressed is provided on the end face 13d1 of the projection 13d projecting from the bottom surface of the recess 13c; the opposed piston type disc brake 10 is configured such that the first pressing section 15a1 acts the first pressing force Fc for pressing the pair of brake pads 13 toward the trailing side at the first pressing point P1 in the first section 13c1 to be pressed, and the second pressing section 15a2 acts the second pressing force Fn for pressing the pair of brake pads 13 inward in the radial direction at the second pressing point P2 in the second section 13d2 to be pressed; and the end face 13d1 of the projection 13d is provided such that the first pressing point P1 and the second pressing point P2 exist on the first virtual plane H1 orthogonal to the acting direction of the second pressing force Fn.

Therefore, the end face 13d1 of the projection 13d, on which the second pressing point P2 is provided, can be provided such that the first pressing point P1 and the second pressing point P2 exist on the first virtual plane H1 (on first virtual plane). In other words, the end face 13d1 of the projection 13d can be provided so as to coincide with the first virtual plane H1.

In this way, when the first pressing point P1 and the second pressing point P2 exist on the first virtual plane H1 (on first virtual plane), the pair of brake pads 13 turns about the first pressing point P1 and the second pressing point P2 exists on a virtual circle E which radius is the distance between the first pressing point P1 and the second pressing point P2. Therefore, the second pressing section 15a2 can apply the second pressing force Fn in a direction that coincides with the tangential direction of the virtual circle E. Therefore, the second pressing section 15a2 can act the second pressing force Fn on the second section 13d2 to be pressed without generating a component force at the start of turning with respect to the second pressing point P2 turning along the virtual circle E, that is, the second section 13d2 to be pressed. Furthermore, the second pressing section 15a2 acts the component force that coincides with the tangential direction of the second pressing force Fn to the second section 13d2 to be pressed with respect to the second pressing point P2 that started turning along the virtual circle E, that is, the second section 13d2 to be pressed.

Therefore, the second pressing force Fn acting on the second pressing point P2 can efficiently decelerate the brake pad 13 turning about the first pressing point P1. Therefore, the second pressing section 15a2 can greatly reduce the momentum of the turning brake pad 13 and prevent the occurrence of the abutment sound (clunking sound) when the pair of brake pads 13 turns and abuts against the torque receiving portion 12c1 on the leading side of the caliper 12.

Furthermore, in this case, the acting direction of the first pressing force Fc and the acting direction of the second pressing force Fn are orthogonal to the axial direction, and are orthogonal to each other on a second virtual plane H2 (on second virtual plane) where the first pressing point P1 and the second pressing point P2 exist.

Therefore, when the first pressing point P1 and the second pressing point P2 exist on the first virtual plane H1 (on first virtual plane) and the second virtual plane H2 (on second virtual plane) and the acting direction of the first pressing force Fc and the acting direction of the second acting force Fn are orthogonal to each other on the second virtual plane H2, the first pressing section 15a1 can act the first pressing force Fc on the first section 13c1 to be pressed from the first pressing point P1 without generating a component force toward the trailing side. That is, the first pressing section 15a1 presses the first section 13c1 to be pressed with the first pressing force Fc at the first pressing point P1 to strongly press the pair of brake pads 13 against the torque receiving portion 12c1. As a result, the first pressing section 15a1 can reliably generate the rotational behavior of the pair of brake pads 13 about the first pressing point P1 at the time of braking.

Furthermore, when the first pressing point P1 and the second pressing point P2 exist on the first virtual plane H1 and the second virtual plane H2 and the acting direction of the first pressing force Fc and the acting direction of the second acting force Fn are orthogonal to each other on the second virtual plane H2, the second pressing section 15a2 can act the second pressing force Fn in a direction that coincides with a tangential direction of the virtual circle E as the second pressing point P2 exists on the virtual circle E. Therefore, the second pressing section 15a2 can act the second pressing force Fn on the second section 13d2 to be pressed without reliably generating a component force at the start of turning with respect to the second pressing point P2 turning along the virtual circle E, that is, the second section 13d2 to be pressed.

Therefore, the first pressing section 15a1 presses the first section 13c1 to be pressed with the first pressing force Fc thus preventing the pair of brake pads 13 from moving from the trailing side to the leading side, and can reliably turn the pair of brake pads 13 about the first pressing point P1. Furthermore, the second pressing section 15a2 presses the second section 13d2 to be pressed with the second pressing force Fn thus reliably decelerating the pair of brake pads 13 turning about the first pressing point P1. As a result, the generation of abnormal sound (brake noise) and abutment sound (clunking sound) generated at the time of braking and abnormal sound (rattling sound) generated at the time of non-braking can be satisfactorily prevented.

Modified Example of the Embodiment

In the above embodiment, the recess 13c is provided on the outer peripheral section of the back plate 13a of the pair of brake pads 13, the pair of brake pads 13 includes the first section 13c1 to be pressed on the side surface on the trailing side of the recess 13c, and includes the second section 13d2 to be pressed on the end surface 13d1 of the projection 13d provided on the bottom surface of the recess 13c.

Figure 8:
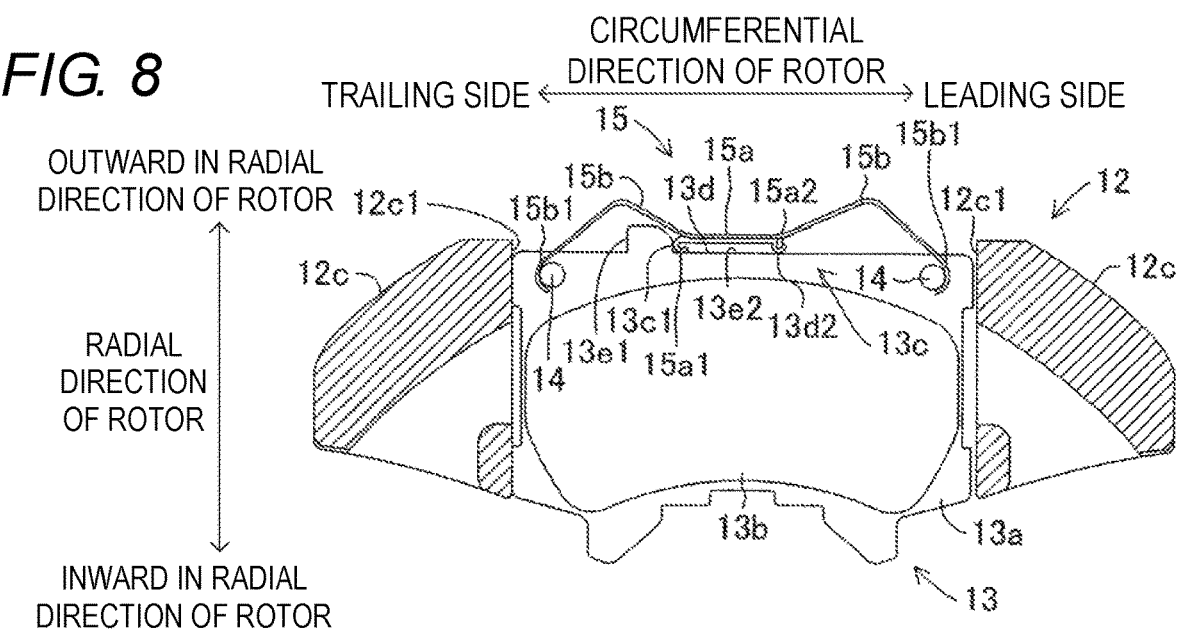
FIG. 8 is a partial cross-sectional view showing a brake pad, a pad pin and a pad spring assembled to a caliper in accordance with a modified example of the embodiment.

In this case, as shown in FIG. 8, a raised portion 13e1 raised outward in the radial direction of the rotor is provided on the outer peripheral section of the back plate 13a of the pair of brake pads 13 on the trailing side, and the pair of brake pads 13 can also include the first section 13c1 to be pressed on the raised portion 13e1 and the second section 13c2 to be pressed on the outer surface 13e1 of the back plate 13a.

In this case as well, when the first pressing point P1 and the second pressing point P2 exist on the first virtual plane H1 (on first virtual plane) and the second virtual plane H2 (on second virtual plane) and the acting direction of the first pressing force Fc and the acting direction of the second acting force Fn are orthogonal to each other on the second virtual plane H2, the first pressing section 15a1 can act the first pressing force Fc on the first section 13c1 to be pressed from the first pressing point P1 without generating a component force toward the trailing side. That is, the first pressing section 15a1 presses the first section 13c1 to be pressed with the first pressing force Fc at the first pressing point P1 to strongly press the pair of brake pads 13 against the torque receiving portion 12c1. As a result, the first pressing section 15a1 can reliably generate the rotational behavior of the pair of brake pads 13 about the first pressing point P1 at the time of braking.

Furthermore, when the first pressing point P1 and the second pressing point P2 exist on the first virtual plane H1 and the second virtual plane H2 and the acting direction of the first pressing force Fc and the acting direction of the second acting force Fn are orthogonal to each other on the second virtual plane H2, the second pressing section 15a2 can act the second pressing force Fn in a direction that coincides with a tangential direction of the virtual circle E as the second pressing point P2 exists on the virtual circle E. Therefore, the second pressing section 15a2 can act the second pressing force Fn on the second section 13d2 to be pressed without reliably generating a component force at the start of turning with respect to the second pressing point P2 turning along the virtual circle E, that is, the second section 13d2 to be pressed.

Therefore, the first pressing section 15a1 presses the first section 13c1 to be pressed with the first pressing force Fc thus preventing the pair of brake pads 13 from moving from the trailing side to the leading side, and can reliably turn the pair of brake pads 13 about the first pressing point P1. Furthermore, the second pressing section 15a2 presses the second section 13d2 to be pressed with the second pressing force Fn thus reliably decelerating the pair of brake pads 13 turning about the first pressing point P1. As a result, the generation of abnormal sound (brake noise) and abutment sound (clunking sound) generated at the time of braking and abnormal sound (rattling sound) generated at the time of non-braking can be satisfactorily prevented.

The present invention is not limited to the above embodiment, and various modified examples can be adopted within the scope of the present invention.

For example, in the above-described embodiment, the first pressing section 15a1 of the pad spring 15 is provided in a circular arc shape convex toward the trailing side in the circumferential direction of the rotor, and the second pressing section 15a2 of the pad spring 15 is provided in a circular arc shape convex inward in the radial direction of the rotor. In this case, any shape may be used as long as the first pressing section 15a1 can press the first section 13c1 to be pressed to the trailing side and the second pressing section 15a2 can press the second section 13d2 to be pressed inward in the radial direction of the rotor.

Figure 9:
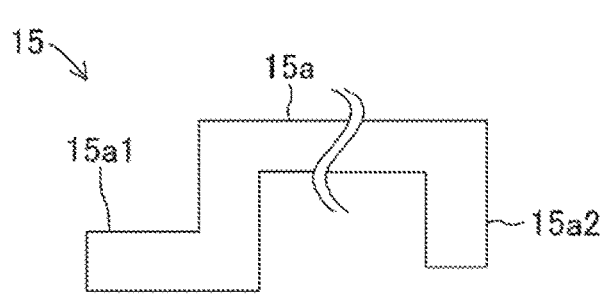
FIG. 9 is a view showing shapes of a first pressing section and a second pressing section in accordance with a modified example of the embodiment.

Specifically, as shown in FIG. 9, the first pressing section 15a1 and the second pressing section 15a2 can be provided on a flat plate shape and pressed with the end portions. In this case, the pad spring 15 is manufactured by punching a leaf spring into a predetermined shape, and performing bending process on necessary parts of the obtained blank material. Therefore, for example, as the base 15a elastically deforms, the first pressing section 15a1 can press the first section 13c1 to be pressed with the first pressing force Fc, and the second pressing section 15a2 can press the second section 13d2 to be pressed with the second pressing force Fn, similar to the above embodiment. Therefore, in this case as well, effects similar to the above embodiment can be obtained.

Figure 10:
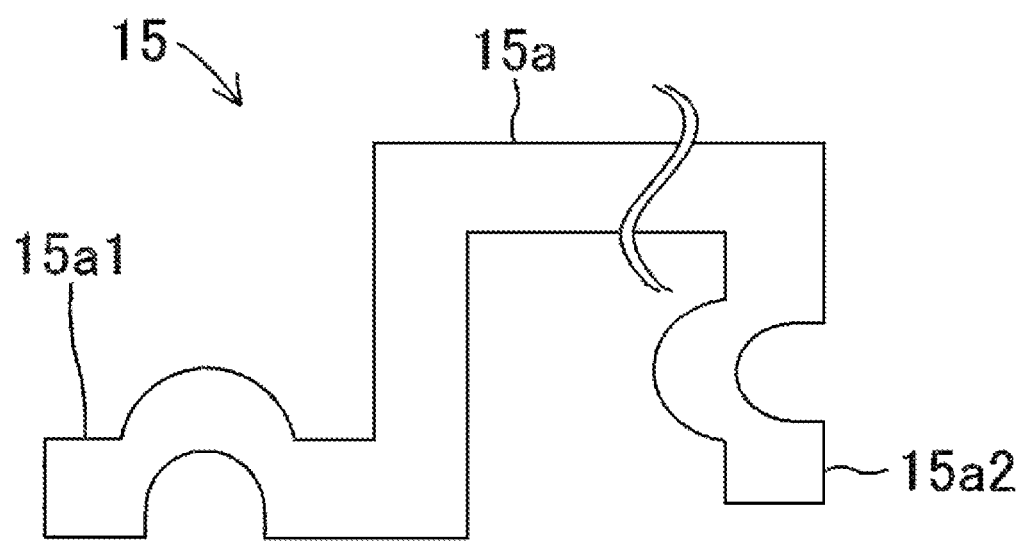
FIG. 10 is a view showing shapes of a first pressing section and a second pressing section in accordance with a modified example of the embodiment.

Furthermore, as shown in FIG. 10, the first pressing section 15a1 and the second pressing section 15a2 may be provided to have a flat plate shape and to include a recess (convex portion) extending in the axial direction of the rotor, and pressed with a distal end portion. In this case, as the recess (convex portion) extends and contracts, the first pressing section 15a1 can press the first section 13c1 to be pressed with the first pressing force Fc, and the second pressing section 15a2 can press the second section 13d2 to be pressed with the second pressing force Fn, similar to the above embodiment. Therefore, in this case as well, effects similar to the above embodiment can be obtained.

The invention claimed is:

1. An opposed piston type disc brake comprising:
a disk-shaped disc rotor;
a caliper that is provided so as to cross one portion of an outer peripheral section of the disc rotor and that accommodates pistons arranged on both sides in an axial direction of the disc rotor;
a pair of brake pads pressed by the piston in an interior of the caliper to press the disc rotor from both sides in the axial direction;
a pair of pad pins provided on a leading side and a trailing side in a circumferential direction of the disc rotor to support the pair of the brake pads to be movable in the axial direction with respect to the caliper; and
a pad spring including a base extending in the axial direction, and a first locking portion extending from the base toward the leading side and a second locking portion extending from the base toward the trailing side in the circumferential direction and respectively locked with one of the pair of the pad pins, the pad spring pressing the pair of the brake pads; wherein
the pair of the brake pads includes:
a first section to be pressed provided on the trailing side of the outer peripheral section and raised outward in a radial direction of the disc rotor, and a second section to be pressed provided on the outer peripheral section; and
the pad spring includes
a first pressing section that extends in the axial direction and is provided on the base and that presses the first section to be pressed of the pair of the brake pads toward the trailing side, and
a second pressing section that extends in the axial direction and is provided on the base and that presses the second section to be pressed of the pair of the brake pads inward in the radial direction,
the second section to be pressed is provided on an end face of a projection projecting outward in the radial direction of the disc rotor from the outer peripheral section,
the first pressing section acts a first pressing force to press the pair of the brake pads toward the trailing side at a first pressing point of the first section to be pressed, the second pressing section acts a second pressing force to press the pair of the brake pads inward in the radial direction at a second pressing point of the second section to be pressed, the end face of the projection is provided so that the first pressing point and the second pressing point exist on a first virtual plane orthogonal to the acting direction of the second pressing force, the first section to be pressed and the second section to be pressed are orthogonal to each other, the first pressing section perpendicularly presses the first section to be pressed toward the trailing side, the second pressing section perpendicularly presses the second section to be pressed inward in the radial direction of the rotor, the magnitude of the first pressing force is set larger than the magnitude of the second pressing force, and the first pressing section is configured to, during braking, cause rotation behavior of the pair of brake pads about the first pressing point.

2. The opposed piston type disc brake according to claim 1, wherein the second pressing section is provided on the leading side of the first pressing section in the circumferential direction.

3. The opposed piston type disc brake according to claim 1, wherein the first pressing section and the second pressing section are arranged to project out from the base in a direction orthogonal to the axial direction toward the pair of the brake pads and to be parallel with each other in the axial direction on the base.

4. The opposed piston type disc brake according to claim 2, wherein the first pressing section and the second pressing section are arranged to project out from the base in a direction orthogonal to the axial direction toward the pair of the brake pads and to be parallel with each other in the axial direction on the base.

5. The opposed piston type disc brake according to claim 1, wherein the acting direction of the first pressing force and the acting direction of the second pressing force are orthogonal to each other on a second virtual plane which is orthogonal to the axial direction and on which the first pressing point and the second pressing point exist.

\* \* \* \* \*